United States Patent [19]
Seager et al.

[11] 3,751,631
[45] Aug. 7, 1973

[54] TEMPERATURE CONTROL SYSTEMS

[75] Inventors: Brent H. A. Seager, Stoney Stanton; Geoffrey A. Williams, Ernsford Grange, both of England

[73] Assignee: Dunlop Limited, London, England

[22] Filed: Feb. 14, 1972

[21] Appl. No.: 225,956

[30] Foreign Application Priority Data
Feb. 17, 1971   Great Britain................... 4,794/71

[52] U.S. Cl................................ 219/485, 219/486
[51] Int. Cl. ............................................. H05b 1/02
[58] Field of Search.................... 219/483, 484, 485, 219/486, 497; 307/33

[56] References Cited
UNITED STATES PATENTS
3,159,736   12/1964   Wicks................................ 219/483
3,475,588   10/1969   McMaster........................... 219/486

Primary Examiner—Bernard A. Gilheany
Assistant Examiner—F. E. Bell
Attorney—John A. Young

[57]  ABSTRACT

A heater control system, particularly for temperature unbalance arising in the currents flowing in three heater elements supplied from a three-phase power supply. The current unbalance may be created as a result of a short-circuit, or may in a temperature control circuit be dependent on changes in the resistance of one heater element having a different temperature coefficient from that of the other elements.

15 Claims, 2 Drawing Figures

TEMPERATURE CONTROL SYSTEMS

This invention relates to temperature control systems, and particularly, but not exclusively to temperature control systems for use in aircraft electrical de-icing systems.

One object of the invention is to provide a simple and effective temperature control system for an aircraft electrical de-icing system.

According to the invention a control system for an electrical multi-phase heating system incorporating a heater element for each phase comprises a current balance detector arranged to provide a signal dependent on the algebraic sum of the currents in the heater elements, and a control circuit responsive to said signal to actuate means for regulating the supply of power to the heater elements.

The control system in accordance with the invention may be arranged to cut off power from the heating system in the event of a gross current unbalance arising for example due to a short-circuit which may be produced by arcing between a heater element and ground or within a heater element.

The control system may also be used for temperature control by arranging for one heater element, or a portion of one heater element, to have a different coefficient of change of resistance with temperature from that of the remaining heater elements. A change in temperature from a predetermined temperature will then cause a change in the signal produced by the current balance detector, which can then be arranged to regulate the supply of power to the heater elements so as to restore the temperature of the elements to the predetermined level.

Two embodiments of the invention will now be described by way of example, with reference to the accompanying drawings, in which.

Figure 1:
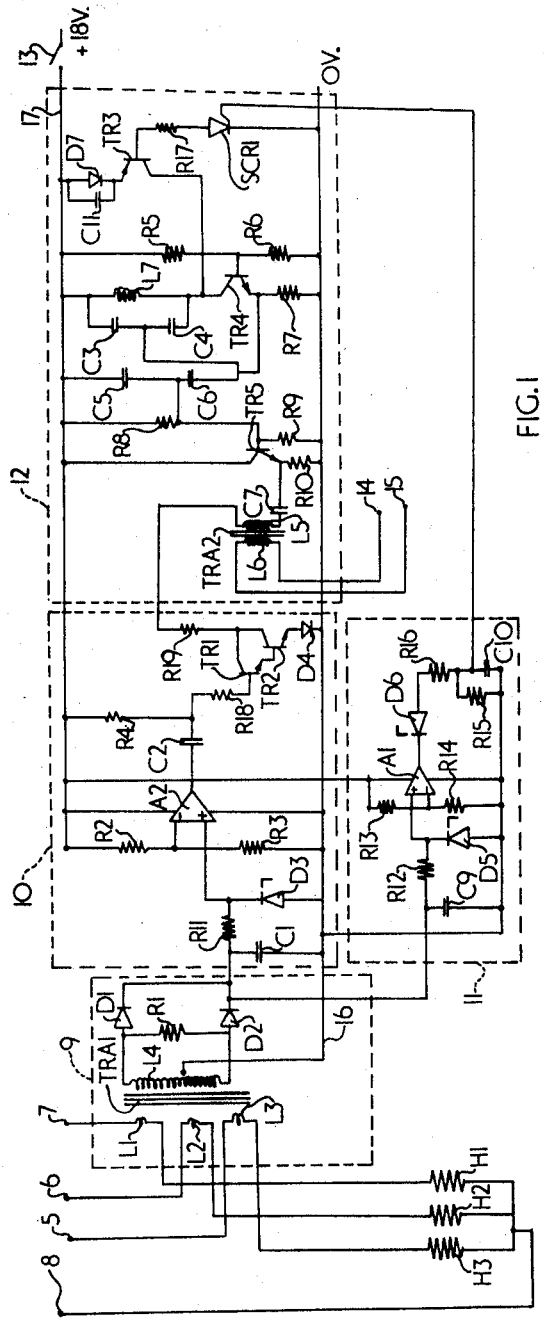
FIG. 1 is a circuit diagram of a temperature control system.

With reference to FIG. 1, an aircraft de-icing system comprises a heater mat having three electrical heater elements H1, H2 and H3 arranged to be supplied with electrical power from a three-phase alternating current supply through terminals 5, 6, 7 and star point 8.

The heater elements H1, H2 and H3 are connected together in star formation, each element being connectable through one of terminals 5–7 and a solid state load switch to one of the phases of the power supply and the star point 8 of the three heaters being earthed relative to the power supply generator. Three primary windings L1, L2 and L3 of a current balance transformer TRA1 each have an equal number of turns and are connected, respectively, each in series between a heater element and its associated load switch. The transformer operates in a current unbalance detector circuit 9 and has a single secondary winding L4 sensitive to the net magnetic flux set up in the core of the transformer by the currents flowing through the heater elements and their associated primary windings. The electromotive force generated in the secondary winding is therefore proportional to the algebraic sum of the currents flowing in the three heater elements and when these elements are of equal resistance the algebraic sum of the currents is zero and hence the electromotive force generated is also zero.

A control circuit is arranged to be operated by the current balance transformer, in response to changes in the algebraic sum of the current flow in the heater circuits, to switch power to the heater circuits or to isolate the heater circuits from the supply according to the values of the resistances in each circuit at any instant.

For the purpose of controlling the temperature of the heater elements the element H1 is formed in part of a conducting material having a high resistance-temperature coefficient so that its resistance varies to a greater extent with variation of the element temperature than does the resistance of the conducting material of the remaining heater elements. The high resistance-temperature coefficient may be positive or negative and the resistance of the high resistance-temperature coefficient element is preselected so that only when the heater elements are just above the desired operating temperature does the resistance of this element equal the resistance of each of the two other elements. Thus when the heater elements are initially powered from cold the maximum current flowing through the high resistance-temperature coefficient element is greater than the maximum current flowing in either of the two other elements and there is a resultant current unbalance in the three phases of the supply. An electromotive force is generated in the transformer secondary winding in proportion to the magnitude of the out-of-balance current and is applied to the input of a part of the control circuit which forms a current null detector 10 (to be described). When the elements have attained the desired temperature there is a near current balance condition between the three phases of the supply and a near null input signal to the current null detector circuit 10. The current null detector circuit will then respond by actuating the load switches simultaneously to cut off the power supply to the heater elements.

A reset circuit (to be described) is provided within the circuit 10 to apply signals at regular intervals to the load switches to switch the power supply to the heater elements. Thus the power supply is reconnected to the elements within a predetermined time interval after the elements have attained the desired operating temperature and the power supply has been cut off. During the cut-off period the temperature of the elements will have decreased below the desired value and the resultant current unbalance will generate an electromotive force in the transformer secondary winding which will prevent the null detector and reset circuit 10 actuating the load switch to cut off the power supply, until the desired element temperature is once more attained.

In an alternative arrangement (not illustrated) temperature control may be effected by using a load switch comprising three silicon controlled rectifiers and arranging the current null detector to control continuously the firing angles of the silicon controlled rectifiers in accordance with variations in the magnitude of the signal derived from the transformer secondary winding.

In the circuit shown in FIG. 1, to safeguard the heater elements in the event of arcing, the output of the transformer secondary coil is connected to a second part of the control circuit which operates as a gross current unbalance detector 11 and which reacts only to large degrees of unbalance such as would arise from a short circuit in one heater.

In the event of arcing of any of the heater elements the algebraic sum of the currents through the elements is no longer zero and hence the transformer secondary winding will generate an unbalance signal of magnitude greater than that which normally results from temperature effects on the resistance loading of each element. The unbalance signal is compared in magnitude, in the gross unbalance detector 11, with a reference signal of a predetermined magnitude greater than any unbalance signal which may arise in the secondary winding during operation of the heater elements over their normal temperature range, and the difference between the magnitudes of the two signals is amplified. The arrangement of the unbalance detector is such that should arcing occur, the magnitude of an amplified unbalance signal will exceed the comparison signal and the gross unbalance detector will actuate the three load switches simultaneously to cut off the power supply to the heater elements.

The gross unbalance detector may be reset by switching the whole control system off and then on again using switch 13, to reapply power to the heater elements. If a large unbalance signal persists the gross unbalance detector will again actuate the load switches to cut off the power supply to the heater elements. The gross unbalance detector described above is also of use in a system in which none of the elements has a higher resistance-temperature coefficient than the remaining elements, the gross current unbalance detector operating purely as an arcing detector.

A more detailed description of the temperature control and arcing detector system described in outline above will now be given with further reference to FIG. 1.

The control circuit for a heating system incorporating a high resistance-temperature coefficient element H1 comprises four sub-circuits, the current unbalance detector circuit 9, the null detector and reset circuit 10, the gross current unbalance detector 11, and as oscillator circuit 12 to control three silicon controlled rectifiers (S.C.R.'s) which are not illustrated but are of conventional type acting as solid state load switches in the lines connected to terminals 5, 6, and 7.

A load switch control transformer TRA2 is provided with a primary winding L5 connected to the output of the oscillator and is provided with three secondary windings, only one of which, L6, is shown, to transmit pulses from the oscillator output to the S.C.R.'s via terminals e.g., 14, 15 to control the power supply to the heater elements.

The null detector circuit 10 includes a transistor output stage TR1, TR2 which is arranged in series with the oscillator output, normally to present a low impedance, but during current balance conditions to present a high impedance between the oscillator ground line reference and the control transformer primary winding L5 to which the oscillator output is applied. In consequence, during current balance conditions, there is an attenuation in the magnitude of the pulses generated in the primary winding and the associated S.C.R.'s are thereby prevented from conducting power to the heater elements. Also, the gross current unbalance detector circuit 11 is arranged to control a shunt circuit R17, SCR1 within the oscillator so that in the event of arcing, or a short circuit occurring in any of the heater elements the output of the gross current unbalance detector will cause the oscillator to be inhibited and thereby prevent the S.C.R.'s from conducting power to the heater elements. The reset circuit, provided to apply signals at regular intervals to the load switches to power the elements, is incorporated within the null detection circuit 10.

Signals generated in the secondary winding of the current balance transformer TRA1 during current unbalance conditions are rectified and fed to both the gross current unbalance detector circuit 11 and the null detector circuit 10. The transformer secondary winding L4 is centre-tapped to provide a ground line reference 16 for the alternating voltages which are generated during a current unbalance condition and which appear as a sinusoidally varying potential difference across a load resistor R1 connected in parallel with the secondary winding 14. A pair of diodes D1, D2 are arranged at the two ends of the secondary winding to full wave rectify the voltage signal generated across the load resistor and thereby provide an output signal in the form of a series of half wave pulses, having a positive potential relative to the ground line reference.

The gross current unbalance detector circuit comprises a differential amplifier A1 used as a voltage comparator which compares the output signal of the transformer secondary winding and a reference signal of a magnitude greater than any unbalance signal which would arise during normal operation of the heater elements.

The reference signal, of a constant voltage level, is fed to one input terminal of the differential amplifier from a connection between a pair of resistors R13, R14 connected in series between a d.c. power supply line and the ground line, the pair of resistors operating as a potential divider.

The rectified transformer output signal is smoothed within the gross unbalance detector circuit 11 by means of a capacitor C9 connected between the signal line and the ground line and then passes through a resistor R12 to a second input terminal of the differential amplifier A1. The resistor R12, and a Zener diode D5 connected between the amplifier input terminal and the ground line serve to protect the amplifier from any excessively large signal which may arise in the case of a fault condition in the control transformer secondary winding and associated rectifying circuit. In the event of an excessively large input signal, of a greater magnitude than would result from arcing or a short circuit of any of the elements, the diode D5 would be biased to conduct current through the resistor R12 to the ground line reference and thereby protect the differential amplifier.

The difference between the reference signal and the output signal of the secondary winding is amplified by the differential amplifier A1 and applied to a Zener diode D6. The threshold voltage of the Zener diode is selected to be greater than the voltage of any amplified signal which may arise during the normal operation of the heater elements and less than any amplified signal which would result from arcing or a short circuit of any of the heater elements. Hence, in the event of arcing the Zener diode passes current in the "Zener direction."

The resultant current flow through the diode D6 is connected to a potential divider R15, R16, the voltage across R15 being smoothed by capacitor C10 and arranged to trigger a silicon controlled rectifier SCR1 in circuit 12 which inhibits the oscillator.

The oscillator is a Colpitts type of circuit comprising an inductor L7 arranged in parallel with a series connected pair of capacitors C3, C4, and operates at a very high frequency compared with the frequency of the alternating current supply to the heater elements.

One connection between the inductor and the capacitors is connected to the d.c. power supply line 17 and the other connection between the inductor and the capacitors is connected to the collector of an oscillator circuit transistor TR4. The emitter of the transistor is connected through a load resistor R7 to the ground reference line 16 and to the connection between the two capacitors C3 and C4 of the inductor-capacitor circuit. The transistor TR4 is normally biased to conduct by a potential applied to the base of the transistor and derived from the junction of a pair of resistors R5 and R6 connected in series between the power supply line 17 and the ground line 16.

A control transistor TR3, is arranged at the input to the oscillator with its collector connected to the collector of the oscillator circuit transistor TR4, and with its emitter connected to the supply line 17 through a diode D7 and capacitor C11 connected in parallel. The base of the control transistor TR3 is connected to the ground line reference 16 through a resistor R17 arranged in series with the silicon controlled rectifier SCR1 which as previously described is controlled by the output of the gross current unbalance detector circuit 11. Thus, whenever the input to the gross current unbalance detector is such as to cause SCR1 to conduct, the control transistor TR3 is biased to conduct and connect the potential of the power supply line to the collector of the transistor TR4. The inductor capacitor circuit is thereby effectively short circuited between the power supply line and the collector of TR4 and oscillations are therefore inhibited.

Under normal operation of the oscillator the oscillations are current amplified by the circuit including transistor TR5 and resistors R8, R9, R10 and produce a pulsing signal on a capacitor C7 which is connected to the primary winding L5 of the load switch control transformer TRA2. The pulses within the primary winding L5 induce corresponding pulses within the control transformer secondary winding L6 which are passed to a conventional zero voltage switch trigger circuit (not shown) and arranged to cause operation of the S.C.R. load switches and thus permit current to pass to the heater elements.

When arcing or a short circuit occurs in any of the heater elements the gross current unbalance detector 11 will inhibit the oscillator by short circuiting the inductor capacitor circuit through S.C.R.1 in the manner described. Under these conditions no pulses are generated in the control transformer secondary winding L6 and the load switch S.C.R.'s will not be triggered to conduct current to the heater elements. The oscillations within the oscillator will continue to be inhibited even after the arcing or the short circuit have ceased, since SCR1 will continue to conduct once it has been triggered. It is therefore necessary to momentarily interrupt the power supply to the control transistor TR3, using switch 13, in order to reset S.C.R.1 and thereby permit the oscillator to function normally.

The current null detector circuit 10 comprises a differential amplifier A2 which amplifies the difference between the output signal of the current balance transformer secondary winding and a reference signal of a magnitude greater than that of any signal which would arise during operation of the heater elements outside the desired temperature range.

The reference signal, of a constant voltage level, is fed to one input terminal of the differential amplifier A2 from the connection between a pair of resistors R2, R3 connected in series between the d.c. power supply line 17 and the ground line reference 16. The other input terminal of the amplifier is fed with a d.c. signal related to the rectified output signal of the transformer secondary winding L4. The output signal from the current transformer TRA1 is smoothed within the null detector by a capacitor C1 connected between the signal line and the ground line and then passes through a resistor R11 to a second input terminal of the differential amplifier. The resistor R11, and a Zener diode D3 connected between the amplifier input terminal and the ground line, serve to protect the amplifier from any excessively large signal such as may arise in the event of arcing or a short circuit of any of the heater elements, or a fault condition in the current balance transformer and associated rectifying circuit.

When the heater elements are below the required temperature the voltage level at R11 exceeds the voltage level of the reference signal, the voltage at the differential amplifier output is high and the capacitor C2 is charged between this voltage and a lower voltage at the junction of R4 and R18 which is arranged to bias a first transistor TR1 of a cascade pair of transistors TR1, TR2 into conduction. In this condition the output impedance of the null detector transistor TR2 is low and thereby permits sufficient current to flow from the oscillator output through the control transformer secondary winding to actuate the S.C.R. load switches to apply power to the heater elements.

The arrangement of the cascade pair TR1 and TR2 is such that once they are in conduction they continue to conduct until a negative-going pulse arrives at the base of TR1.

When the elements have increased in temperature to within the desired temperature range and a near current balance situation exists, there will be a decrease in the level of the d.c. signal on the capacitor C1 at the input to the differential amplifier A2. When the voltage level at R11 drops below the voltage level of the reference signal, the voltage output from the differential amplifier will drop, the charge on C2 will pass back through the amplifier output impedance to the ground line reference, and the base of the transistor TR1 will thereby be connected to a temporarily negative voltage with respect to the ground line reference. Therefore TR1 will cease to conduct, the transistor TR2 will present a high output impedance, and pulses will be prevented from passing through the control transformer TRA2 to actuate the load switches.

After a predetermined time interval dependent on the time constant of capacitor C2, high impedance resistor R4, and the output impedance of the differential amplifier, the capacitor C2 will discharge and the voltage at the base of TR1 will gradually increase and reach a sufficient level to switch on the pair of transistors TR1, TR2 and cause power to be reapplied temporarily in the manner previously described.

Figure 2:
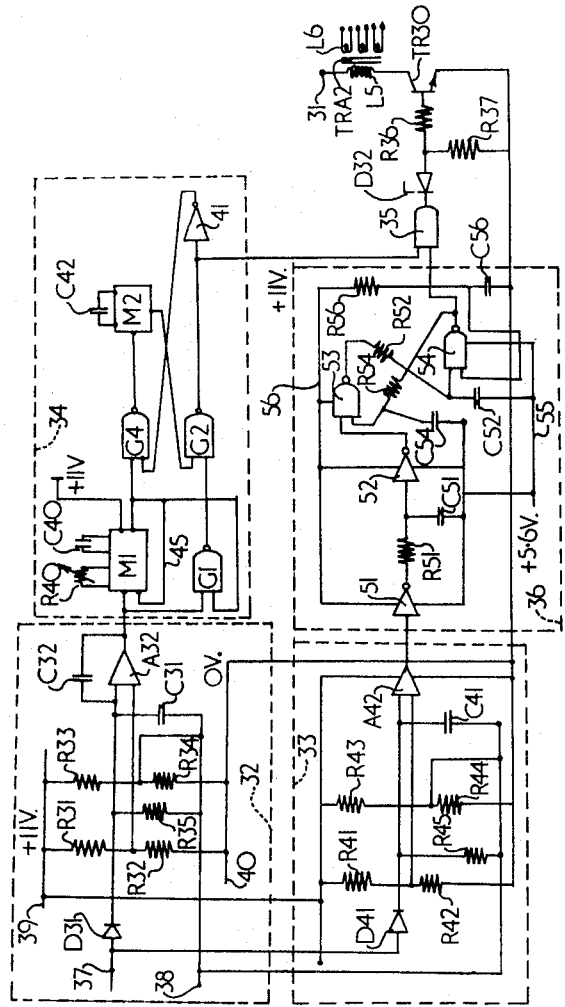
FIG. 2 is a circuit diagram of a modified system.

FIG. 2 shows an alternative system which differs from that of FIG. 1 mainly in that it uses integrated logic circuits to control the transmission of oscillations through an output transformer TRA2 which is arranged to receive the output from an oscillator (not shown) at terminal 31 and to supply load switch trigger circuits (not shown) through three secondary windings L6 as in the circuit of FIG. 1.

The system shown in FIG. 2 incorporates a current unbalance and null detector circuit 32 and a gross unbalance detector circuit 33 which correspond in function to the early stages of circuits 9, 10 and 11 of FIG. 1.

The output from the null detector circuit 32 is fed through a logic circuit 34, incorporating switching and reset functions to be described, to one terminal of an AND gate 35 the other terminal of which receives the output signal from a logic circuit 36 actuated by the gross unbalance detector circuit 33. When the signals at both input terminals of AND gate 35 are high, a current is passed through an output stage incorporating a Zener diode D32 and resistors R36, R37 to bring TR30 into conduction so as to complete the circuit through L5 to the oscillator and thus to switch on the heating circuits. If either of the signals at the input terminals of gate 35 is low the circuit through L5 is broken and the power is switched off.

The input to circuits 32 and 33 at terminals 37 and 38 is taken from opposite ends of a secondary winding of a current unbalance transformer (not shown) arranged similarly to transformer TRA1 of the system shown in FIG. 1. Considering circuit 32, the input signal is passed through diode D31, is smoothed by capacitor C31 and develops a potential across R35 which is applied to one input terminal of a differential amplifier A32. The other input terminal of the differential amplifier A32 is supplied with a reference potential taken from potential divider R31, R32 connected across power supply lines 39 and 40. The base line reference for the input signal, terminal 38, is held at a second reference potential tapped from the junction of a second potential divider R33, R34, and the arrangement of the differential amplifier A32 is such that it provides a high level output when the heater element currents are unbalanced and provide an input potential to A32 greater than the reference potential, and a low level output when the heater element currents are balanced and provide an input potential less than the reference potential. A capacitor C32 is connected across amplifier A32 to provide positive feedback.

The logic circuit 34 incorporates first and second monostable circuits M1 and M2, three NAND gate circuits, G1, G2, G4 and invertor 41.

The arrangement of the circuit 34 is best described in terms of its function which, broadly, is to pass a signal corresponding to a high level at the output of A32 to the AND gate 35, causing the heaters to be switched on, while when a low signal appears at the output of A32 a low signal is applied to the AND gate 35 to switch off the heaters. The first monostable circuit M1 has a timed reset function which enables the circuit to test automatically for current balance conditions after the heater current has been switched off, while the second monostable circuit M2, having a second timed reset function, acts to switch off again if current balance has been achieved and the resulting output from A32 is low.

Commencing with the first application of power to the circuits, power does not reach the heater elements immediately and the output of A32 is low. This causes monostable M1 to change to an unstable state in which its output, fed to gate G4, is low. Gate G4 is a NAND gate arranged to pass low signals applied to either input terminal, inverted, as a high signal applied to the input terminal of the second monostable circuit, and this in turn applies a high signal to one input terminal of gate G2. The other input terminal of gate G2 is also held at a high level by a signal from gate G1 which receives and inverts two low signals from A32 and the output of monostable circuit M1.

The output from gate G2 is inverted to a low level which would not operate gate 35 and the following parts of the circuit to connect power to the heater elements, but an inverter 41 is provided to feed a corresponding high level output to gate 4 which, after the reset period of M1 (determined by the time constant of external components R40 and C40) is accompanied by a high level output from M1. This causes a low output to emerge from gate G4, switching M2 to provide a low output to gate G2 and hence resulting in a high output being passed from G2 to operate gate 35 and connect power to the heater elements. The invertor 41 then passes the high level signal back as a low input to gate G4 input, but this has no effect until M2 resets (after a time determined by external capacitor C42).

During the period determined by the reset period of M2 the heater elements are switched on, and if the currents in the elements are unbalanced the output of A32 goes high. This puts two high inputs on gate G1 and a resulting low level output is passed from gate G1 to one input of gate G2. The low level input at G2 predominates, and even when M2 changes back after its reset period to provide a high output the heaters are latched on by the signals passing through gates G1 and G2 as long as current unbalance persists.

As the heater mats warm up, the current unbalance decreases until the null point is reached and the amplifier A32 changes from a high output level to a low output level. This provides by inversion through gate G1 a high input at gate G2 which, together with the high output from M2, causes a low input to be passed to the AND gate 35 and the power is switched off for a period depending on the reset period of M1 as described above.

Operation of M1 is stabilised by a feedback loop 45 which suppresses spurious operations. The reset period of M1 is determined relative to the lowest expected cooling rate of the heater mats so that normally power will be reconnected immediately after each reset period, but even if the heater mats are still at the required temperature after the reset period M1 will have been brought into a responsive condition by unbalance occurring at the previous switching-off of the heater circuits.

The gross unbalance detector circuit 33 and logic circuit 36 function as follows.

The circuit 33 receives current unbalance signals from terminals, 37, 38 and operates in parallel with, and in identical manner to circuit 32 except that the signal at one input of differential amplifier A42 from D41, R45, C41, is compared with a relative reference potential derived from dividers R41, R42; R43, R44 at the other input arranged so that the amplifier A42 produces a high output except when a gross unbalance condition exists, for example as a result of a breakdown of insulation, in one heater mat.

The output from A42 is fed into circuit 36 where it is first inverted by invertor 51 and passed through a delay circuit R51, C51 (to avoid spurious triggering by transients) into a second invertor 52.

The normally high signal from invertor 52 is passed to one input of a NAND gate 53. The output from NAND gate 53 is fed to the input of a second NAND gate 54 which thus has a normally high output in this condition and enables the heater element to be switched on. Gate 54 also passes a high signal through resistor R54, to the other input of gate 53 to "latch-on" a low output signal from gate 53. A damping capacitor C54 is connected between the junction of R54 and gate 53 and a low voltage line 55.

The normally low output signal from gate 53 is passed through resistor R52 to one input of gate 54, the operation of which is damped by a capacitor C52 to prevent spurious operation on transients. The other input on gate 54 is held at a high potential level taken from a higher voltage DC supply line 56, through a resistor R56. Capacitor C56 is provided to hold the associated input to gate 54 at a low level on switching-on the power to the circuit, thus setting gates 53 and 54 in the required state.

When gross unbalance occurs the output from A42 is low, providing a low input to gate 53 which produces a high output from gate 53 and hence a high input level at both input terminals of gate 54. The resulting low output from gate 54 operates through gate 35 to cut off the heater elements, and also provides a low input level via R54 to an input terminal of gate 53, thus "latching-on" the high output signal from gate 53. The heater mats are thus cut off from the power supply until the circuit is manually reset. This can be accomplished as in the circuit shown in FIG. 1 by provision of an on/off switch in the main power line to the control circuit.

The control system in accordance with the invention has the advantage that it enables the temperature of the heater elements to be sensed by means of a single current balance transformer, thus reducing the size, weight, cost and complexity of the system. The direct sensing of the temperature of the heater elements themselves is more accurate and reliable than the use of separate sensors arranged in proximity to the heater elements, and does not require wiring additional to the normal heating wiring to provide temperature sensing means.

We claim:

1. A control system for an electrical multi-phase heating system, comprising: a heater element for each phase of such multi-phase heating system, a primary winding of a current balance transformer operatively connected to said heater element so that the current flowing in said primary winding is directly dependent on the current flow in said heater element, a secondary winding of the same said transformer providing a signal dependent on the algebric sum of the currents in the heater elements, a control circuit operatively connected to said secondary winding and arranged to respond to said signal, and means operatively connected to said control circuit for regulating the supply of power to the heater elements in response to an unbalance of current flowing in said heater elements.

2. A control system according to claim 1 wherein the heater elements form part of the control system, at least part of one heater element having a different coefficient of change of resistance with temperature from that of the remaining heater elements, the control circuit being arranged to actuate the means for regulating the supply of power so as to supply power to the heater elements when the currents in the heater elements are out of balance.

3. A control system according to claim 2 wherein the means for regulating the supply of power comprises load switch means and the control circuit comprises a null detector circuit arranged to receive a signal proportional to the out-of-balance current in the heater windings and to respond to a null signal by actuating the load switch means to cut off the supply to the heater elements.

4. A control system according to claim 3 wherein the null detector circuit incorporates a differential amplifier arranged to compare the input signal with a reference signal, and an output stage arranged to regulate the supply of trigger pulses to the load switch means, the load switch means comprising solid state load switches connected in series with a power supply to the heater elements.

5. A control system according to claim 4 wherein an oscillator is provided to generate trigger pulses for the solid state load switches, the oscillator output being connected to a trigger circuit through means controlled by the output stage of the null detector circuit.

6. A control system according to claim 2 wherein a gross current unbalance detector circuit is provided to cut off the supply of power to the heater elements in the event of gross current unbalance.

7. A control system according to claim 6 wherein the gross current unbalance detector circuit comprises a differential amplifier arranged to compare an input signal proportional to the out-of-balance current with a reference signal, and an output stage, and means for regulating the supply of power to the heater elements comprising solid state load switches connected in series with a power supply to the heater elements and operated by trigger pulses from a source of trigger pulses, the differential amplifier being arranged to cut off the supply of trigger pulses to the solid state load switches when gross unbalance arises.

8. A control system according to claim 7 wherein an oscillator is provided to generate trigger pulses for the solid state load switches, means being provided, controlled by the output stage of the gross current unbalance detector circuit, to inhibit the operation of the oscillator whenever a gross current unbalance condition is detected.

9. A control system according to claim 4 wherein the control circuit incorporates a reset circuit arranged to re-apply power to the heater elements after a predetermined time interval following any operation of the output stage to prevent trigger pulses from passing to the load switches.

10. A control system according to claim 1 wherein the control circuit comprises a current unbalance and null detector circuit arranged to provide an input to a logic circuit, the logic circuit being arranged to control the supply of power to the heater elements.

11. A control system according to claim 10 wherein the logic circuit incorporates a first monostable circuit which can be actuated by the input signal so as to operate through associated gates to switch on power to the heater elements and to disconnect power from the heater elements and which has a timed reset function which enables the power supply to be reconnected to the heater elements to test automatically for current balance conditions at a predetermined time after the heater current has been switched off.

12. A control system according to claim 11 wherein the logic circuit incorporates a second monostable circuit having a second timed reset function which is arranged to operate through associated gates to disconnect the power supply after a predetermined time interval following reconnection of the power supply to the heater elements by the first monostable circuit when current balance exists.

13. A control system according to claim 10 wherein a gross current unbalance detector circuit is arranged to cut off the supply of power to the heater elements in the event of gross current unbalance, the output from the gross current unbalance detector circuit being passed through an associated logic circuit arranged to latch-on any output signal from the gross current unbalance detector circuit which is such as to effect disconnection of the power supply from the heater elements.

14. A control system according to claim 13 wherein the output from the logic circuit associated with the gross current detector circuit is connected to one input terminal of an AND gate, the other input terminal of the AND gate being connected to receive the output from the logic circuit associated with the current unbalance and null detector circuit, and the output from the AND gate being arranged to control the supply of power to the heater elements.

15. A control system according to claim 14 wherein the output from the AND gate is arranged to actuate an output stage to connect trigger pulses from an oscillator to a trigger circuit for solid state load switches associated with the heater elements.

* * * * *